US008965548B1

United States Patent
Kamath et al.

(10) Patent No.: US 8,965,548 B1
(45) Date of Patent: Feb. 24, 2015

(54) SYSTEM AND METHOD OF SOLVING SUPPLY CHAIN CAMPAIGN PLANNING PROBLEMS INVOLVING MAJOR AND MINOR SETUPS

(75) Inventors: Narasimha B Kamath, Bangalore (IN); Devender Chauhan, Bangalore (IN); Deba Kalyan Mohanty, Bangalore (IN); Dinesh Damodaran, Bangalore (IN)

(73) Assignee: JDA Software Group, Inc., Scottsdale, AZ (US)

( * ) Notice: Subject to any disclaimer, the term of this patent is extended or adjusted under 35 U.S.C. 154(b) by 364 days.

(21) Appl. No.: 13/357,915

(22) Filed: Jan. 25, 2012

Related U.S. Application Data

(60) Provisional application No. 61/451,561, filed on Mar. 10, 2011.

(51) Int. Cl.
  *G06F 19/00* (2011.01)
(52) U.S. Cl.
  USPC ............................................ 700/100; 700/97
(58) Field of Classification Search
  CPC . G06Q 10/06; G06Q 10/087; G05B 19/41865
  USPC ............ 700/97, 99, 100, 103, 108, 109, 110; 705/22, 28, 29; 702/81, 182, 183
  See application file for complete search history.

(56) References Cited

U.S. PATENT DOCUMENTS

| | | | |
|---|---|---|---|
| 6,560,502 B1 | 5/2003 | Sundaram et al. | |
| 6,701,201 B2 * | 3/2004 | Hegde et al. | 700/97 |
| 7,222,786 B2 * | 5/2007 | Renz et al. | 705/28 |
| 7,248,937 B1 * | 7/2007 | Brown et al. | 700/99 |
| 7,324,966 B2 * | 1/2008 | Scheer | 705/28 |
| 7,606,743 B2 * | 10/2009 | Orzell et al. | 705/28 |
| 7,933,673 B2 * | 4/2011 | Brown et al. | 700/99 |
| 8,615,416 B2 * | 12/2013 | Milne | 705/7.12 |
| 2001/0032029 A1 * | 10/2001 | Kauffman | 700/99 |
| 2004/0267396 A1 * | 12/2004 | Coppola et al. | 700/100 |
| 2008/0228604 A1 * | 9/2008 | Von Helmolt et al. | 705/29 |

OTHER PUBLICATIONS

Maravelias Christos T., et al., "Integration of production planning and scheduling: Overview, challenges and opportunities", Computers & Chemical Engineering, vol. 33, Issue 12, pp. 1919-1930, 2009.

(Continued)

*Primary Examiner* — Charles Kasenge
(74) *Attorney, Agent, or Firm* — Jackson White, PC; Steven J. Laureanti

(57) ABSTRACT

A system including a computer solves supply chain campaign planning problems involving major and minor setups. The computer is configured to execute a major campaign for two or more of a plurality of major product families and fix an optimal major product family to a major time period on a planning horizon, based at least on aggregated major productivity fractions and calculated second moments of a plurality of two or more major product families. The computer is further configured to execute a minor campaign for two or more minor product families associated with the optimal major product family, obtain a minor productivity fraction of a campaignable resource for the minor product family over at least a portion of a major time period and fix an optimal minor product family from the two or more minor product families to a minor time period based at least on the minor productivity fraction.

18 Claims, 5 Drawing Sheets

(56) References Cited

OTHER PUBLICATIONS

Grunow, Martin, et al., "Campaign planning for multi-stage batch processes in the chemical industry", or Spectrum, vol. 24, pp. 281-314, 2002.

Susarla, Naresh et al., "Integrated Campaign Planning and Resource Allocation in Batch Plants", 20th European Symposium on Computer Aided Process Engineering—ESCAPE20, vol. 28, pp. 1183-1188, 2010.

* cited by examiner

SYSTEM AND METHOD OF SOLVING SUPPLY CHAIN CAMPAIGN PLANNING PROBLEMS INVOLVING MAJOR AND MINOR SETUPS

CROSS-REFERENCE TO RELATED APPLICATIONS

The present disclosure is related to that disclosed in the U.S. Provisional Application No. 61/451,561, filed Mar. 10, 2011, entitled "System and Method for Solving Supply Chain Campaign Planning Problems Involving Major and Minor Setups." U.S. Provisional Application No. 61/451,561 is assigned to the assignee of the present application. The subject matter disclosed in U.S. Provisional Application No. 61/451,561 is hereby incorporated by reference into the present disclosure as if fully set forth herein. The present invention hereby claims priority under 35 U.S.C. §119(e) to U.S. Provisional Application No. 61/451,561.

TECHNICAL FIELD

This invention relates generally to the field of planning, and more particularly to a system and method of integrated production planning and scheduling, taking into account campaign constraints.

BACKGROUND

Master planning typically involves the procurement of raw materials, transforming the raw materials into finished goods and distributing the finished goods to warehouses, retailers and/or customers. This is a typical supply chain where the decisions are more tactical in nature, ranging from procurement, production planning and distribution planning. These tactical decisions are further worked upon to generate operational or execution level decisions, such as, requirements planning, scheduling and transport planning. Many companies are realizing the importance of integration between these two levels, which is critical in industries that have large setup times along with additional constraints of sequence dependency.

Furthermore, the problem is complicated by the fact that often there is a trade-off between inventory and production changeover. For example, producing long runs of a particular product line may decrease changeovers, but it may undesirably increase inventory levels of finished goods or works in progress for a given time frame. In some cases, high inventory is undesirable, for example, because freshness or storage space is a constraint. Further, as one line is produced on a resource for a longer time in order to reduce production changeover, another product, which may have a high demand and low inventory, cannot be simultaneously produced on the same resource. Thus, there are trade-offs between inventory and production changeover that must be taken into account.

The integration of production planning and scheduling in this context mainly arises from the implementability of the plan on the manufacturing floor. Because the setups are sequence-dependent and large, if they are not accounted for during a master plan, the plan becomes infeasible during scheduling. As a result, backlog or shortage is increased. On the other hand, if setups are accounted during master planning, it leads to discrete constraints, changing the problem structure from linear program (LP) to mixed integer program (MIP) and in some cases to mixed integer non linear program (MINLP). Though there are methods for solving each of these on a small scale, when it comes to problems of large scale, there is no method available or acceptable to the customer or planner in terms of plan quality and performance. One of the problems with this is the very large run times (performance) and another is the fundamental understanding of the plan itself.

Therefore, previous techniques of solving campaign planning have proven inadequate and have proven not to be scalable for large scale master planning problems, where tradeoff decisions are made, for at least choosing which plant to manufacture or determining which distribution lane to transport the necessary finished goods.

SUMMARY

A system for solving supply chain campaign planning problems involving major and minor setups is disclosed. The system includes a database configured to store data describing a plurality of major product families, data describing a plurality of minor product families, data describing a campaignable resource, and data describing a planning horizon and a computer comprising a memory and a processor coupled with the database. The computer is configured to execute a major campaign, for two or more of the plurality of major product families comprising obtaining a major productivity fraction of the campaignable resource for an operation associated with major product family, aggregating the major productivity fractions of the campaignable resource for operations associated with the major product family over a time interval that comprises at least a portion of the major time period and calculating a second moment for the major product family over a time interval that comprises at least a portion of the major time period. The computer is further configured to execute a major campaign comprising fixing an optimal major product family of the two or more major product families to the major time period on the planning horizon, in association with the campaignable resource, based at least on the aggregated major productivity fractions and the calculated second moments of a plurality of the two or more major product families. The computer is still further configured to execute a minor campaign, comprising for two or more minor product families associated with the optimal major product family, obtaining a minor productivity fraction of the campaignable resource for the minor product family over at least a portion of the major time period and fixing an optimal minor product family from the two or more minor product families to a minor time period based at least on the minor productivity fraction.

A computer-readable medium embodied with software for solving supply chain campaign planning problems involving major and minor setups is also disclosed. The software when executed using one or more computers is configured to execute a major campaign, for two or more of the plurality of major product families comprising obtaining a major productivity fraction of the campaignable resource for an operation associated with major product family, aggregating the major productivity fractions of the campaignable resource for operations associated with the major product family over a time interval that comprises at least a portion of the major time period and calculating a second moment for the major product family over a time interval that comprises at least a portion of the major time period. The software is further configured to execute a major campaign comprising fixing an optimal major product family of the two or more major product families to the major time period on the planning horizon, in association with the campaignable resource, based at least on the aggregated major productivity fractions and the calculated second moments of a plurality of the two or more major product families. The software is still further configured to execute a minor campaign, comprising for two or more minor product families associated with the optimal major product family, obtaining a minor productivity fraction of the campaignable resource for the minor product family over at least a portion of the major time period and fixing an optimal minor product family from the two or more minor product families to a minor time period based at least on the minor productivity fraction.

A computer-implemented method of solving supply chain campaign planning problems involving major and minor setups is also disclosed. The method provides for executing, by a computer, a major campaign, for two or more of the plurality of major product families, comprising obtaining, by the computer, a major productivity fraction of the campaignable resource for an operation associated with major product family, aggregating, by the computer, the major productivity fractions of the campaignable resource for operations associated with the major product family over a time interval that comprises at least a portion of the major time period and calculating, by the computer, a second moment for the major product family over a time interval that comprises at least a portion of the major time period. The method further provides for executing, by a computer, a major campaign, comprising fixing, by the computer, an optimal major product family of the two or more major product families to the major time period on the planning horizon, in association with the campaignable resource, based at least on the aggregated major productivity fractions and the calculated second moments of a plurality of the two or more major product families. The method still further provides for executing, by the computer, a minor campaign, comprising for two or more minor product families associated with the optimal major product family, obtaining, by the computer, a minor productivity fraction of the campaignable resource for the minor product family over at least a portion of the major time period and fixing, by the computer, an optimal minor product family from the two or more minor product families to a minor time period based at least on the minor productivity fraction.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Reference will now be made to the following detailed description of the preferred and alternate embodiments of the present invention. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
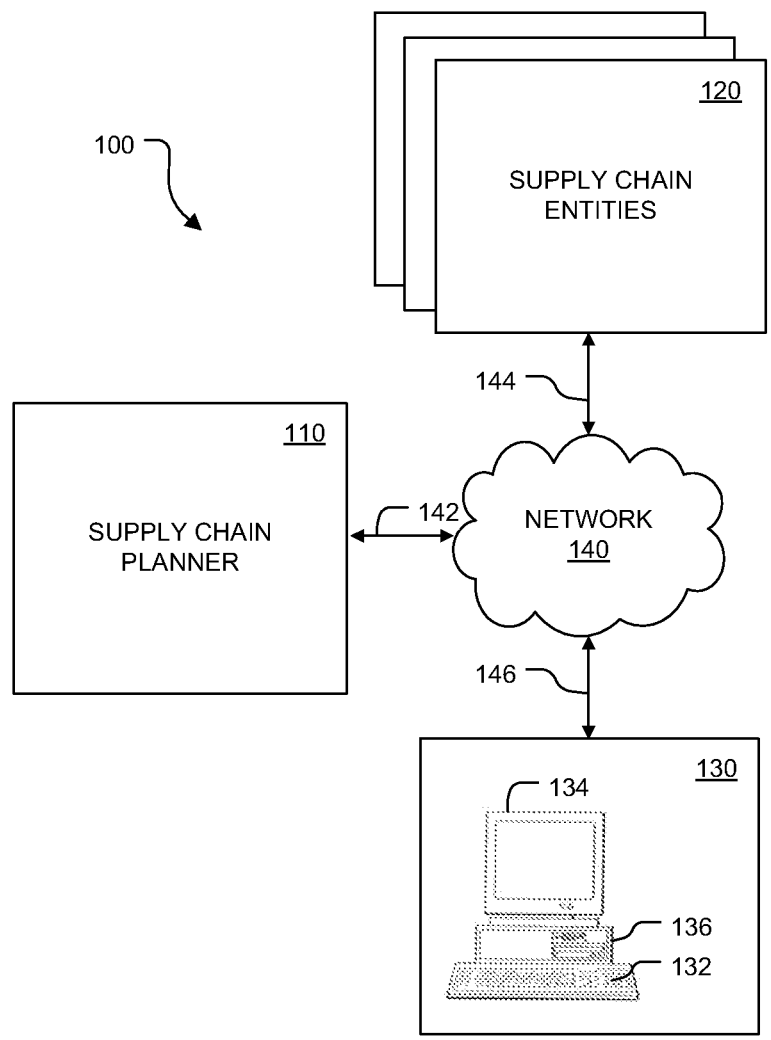
FIG. 1 illustrates a supply chain network, according to embodiments.

FIG. 1 illustrates an exemplary supply chain network 100 according to embodiments. Supply chain network 100 comprises supply chain planner 110, one or more supply chain entities 120, computers 130, a network 140, and communication links 142, 144, and 146. Although a single supply chain planner 110, one or more supply chain entities 120, a single computer 130, and a single network 140, are shown and described; embodiments contemplate any number of supply chain planners 110, any number of supply chain entities 120, any number of computers 130, or any number of networks 140, according to particular needs.

In one embodiment, supply chain network 100 provides for campaign planning within master planning Supply chain planner 110 runs a linear program (LP) problem which provides an iterative approach, such that, the best possible solution in a given circumstance is arrived at with heuristics determining the campaign start and end times. This is done for both major and minor campaigns and the decisions are hierarchically achieved. Moreover, the complete workflow accounts for discrete constraints, such as, for example, sequence dependent setup times, lot-sizing, storage and shelf life constraints.

As an example only and not by way of limitation, in the case of a beverage manufacturer and distributor, the beverage can be manufactured in a bottle (glass or pet), tetra pack or can. The bottle can be of different sizes, such as, for example, 330 ml, 500 ml, or 1000 ml, where the changeover time is sequence dependent and varies from a few hours to several days or longer. In this example, the selection of flavors, e.g. cola, lemon, orange etc., is also sequence dependent (for example, in an embodiment mild flavor to hard flavor is a preferred sequence) and involves setup times, which are typically less than the earlier setup times. Moreover, upstream constraints in, in this example of a bottling line, may be syrup storage tanks, which make it prudent to run the line for at least one shift. Other constraints, such as, for example, shelf life criterion (freshness), require that the product not remain in the supply chain for more than, for example, a couple of months or less.

In addition, for simplicity sake and without loss of generalization embodiments represent the exemplary supply chain campaigns as two levels. That is, embodiments represent these two levels as (1) a major campaign, where a determination is made as to the bottle size (pack size and pack type) and (2) a minor campaign, where a determination is made as to the flavor. It should be understood that the two levels of hierarchy described herein are for illustration purposes only and not by way of limitation. Embodiments contemplate any number of levels, hierarchies or multiple hierarchical levels, according to particular needs.

In one embodiment, supply chain network 100 considers various discrete constraints, such as, for example, sequence dependent setup times, lot-sizing, storage and shelf life constraints of one or more supply chain entities 120 when solving supply chain campaign planning problems involving major and minor setups. As described below in more detail, these various discrete constraints, such as, for example, sequence dependent setup times, lot-sizing, storage and shelf life constraints may prevent one or more supply chain entities 120 from satisfying supply chain demand, and may delay supply chain demand from being satisfied during a particular planning horizon. Although, supply chain network 100 is described as associated with a particular supply chain, supply chain network 100 may solve supply chain campaign planning problems of any number of supply chain entities or for any industry, according to particular needs.

Supply chain network 100 may operate on one or more computers 130 that are integral to or separate from the hardware and/or software that support supply chain planner 110 and one or more supply chain entities 120. Computers 130 may include any suitable input device 132, such as a keypad, mouse, touch screen, microphone, or other device to input information. An output device 134 may convey information associated with the operation of supply chain network 100, including digital or analog data, visual information, or audio information. Computers 130 may include fixed or removable computer-readable storage media, such as magnetic computer disks, CD-ROM, or other suitable media to receive output from and provide input to supply chain network 100. Computers 130 may include one or more processors 136 and associated memory to execute instructions and manipulate information according to the operation of supply chain network 100.

Although a single computer 130 is shown in FIG. 1, supply chain planner 110 and one or more supply chain entities 120 may each operate on separate computers 130 or may operate on one or more shared computers 130. Each of the one or more computers 130 may be a work station, personal computer (PC), network computer, notebook computer, personal digital assistant (PDA), tablet, cell phone, telephone, wireless data port, or any other suitable computing device. In an embodiment, one or more users may be associated with supply chain planner 110. These one or more users may include, for example, a "planner" handling campaignable resources, campaign planning, and/or one or more related tasks within supply chain network 100. In addition, or as an alternative, these one or more users within supply chain network 100 may include, for example, one or more computers programmed to autonomously handle campaignable resources, campaign planning, and/or one or more related tasks within supply chain network 100.

In one embodiment, supply chain planner 110 is coupled with network 140 using communications link 142, which may be any wireline, wireless, or other link suitable to support data communications between supply chain planner 110 and network 140 during operation of supply chain network 100. One or more supply chain entities 120 are coupled with network 140 using communications link 144, which may be any wireline, wireless, or other link suitable to support data communications between one or more supply chain entities 120 and network 140 during operation of supply chain network 100. Computers 130 are coupled with network 140 using communications link 146, which may be any wireline, wireless, or other link suitable to support data communications between computers 130 and network 140 during operation of supply chain network 100.

Although communication links 142, 144, and 146 are shown as generally coupling supply chain planner 110, one or more supply chain entities 120, and computers 130 with network 140, supply chain planner 110, one or more supply chain entities 120, and computers 130 may communicate directly with supply chain planner 110, one or more supply chain entities 120, and computers 130, according to particular needs.

In another embodiment, network 140 includes the Internet and any appropriate local area networks (LANs), metropolitan area networks (MANS), or wide area networks (WANs) coupling supply chain planner 110, one or more supply chain entities 120, and computers 130. For example, data may be maintained by supply chain planner 110 at one or more locations external to supply chain planner 110 and one or more supply chain entities 120 and made available to one or more associated users of one or more supply chain entities 120 using network 140 or in any other appropriate manner. Those skilled in the art will recognize that the complete structure and operation of communication network 140 and other components within supply chain network 100 are not depicted or described. Embodiments may be employed in conjunction with known communications networks and other components.

Figure 2:
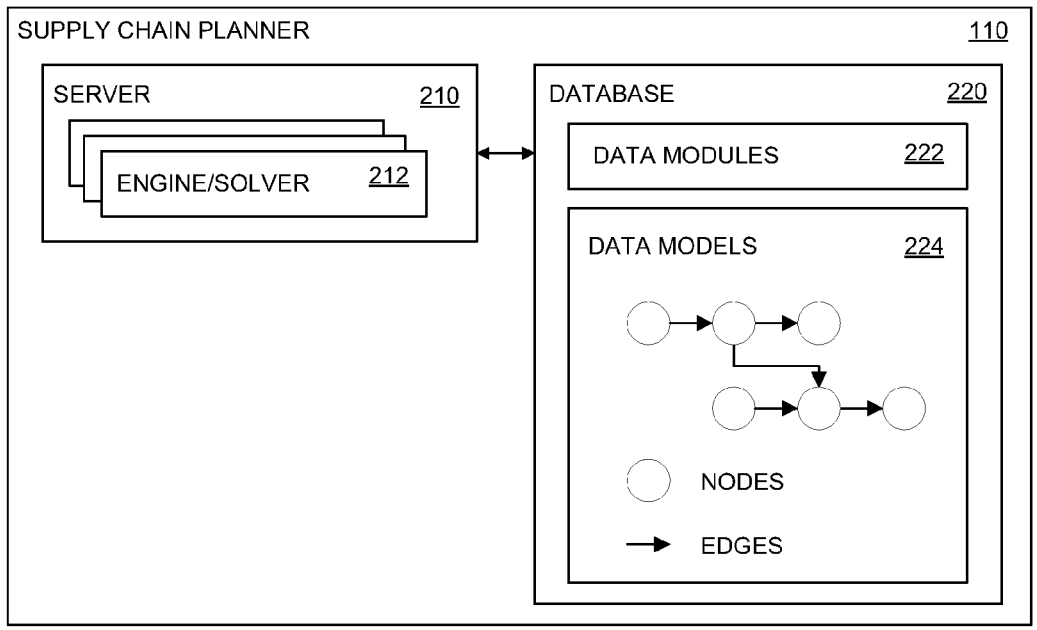
FIG. 2 illustrates an embodiment of a supply chain planner.

FIG. 2 illustrates supply chain planner 110 of FIG. 1 in greater detail in accordance with embodiments. As discussed above, supply chain planner 110 comprises one or more computers at one or more locations including associated input devices, output devices, mass storage media, processors, memory, or other components for receiving, processing, storing, and communicating information according to the operation of supply chain network 100. In an embodiment, supply chain planner 110 stores supply chain data of one or more supply chain entities 120 of supply chain network 100, in database 220.

As discussed in more detail below, server 210 comprises one or more planning engines 212, including a solver for generating an optimized solution (plan) of supply chain campaign planning problems of supply chain network 100. In addition, although server 210 is shown and described as comprising one or more planning engines 212, embodiments contemplate any suitable engine or combination of engines, according to particular needs.

Database 220 comprises one or more databases or other data storage arrangements at one or more locations, local to, or remote from, server 210. Database 220 includes, for example, one or more data modules 222. As an example only and not by way of limitation, database 220 stores supply chain data of one or more supply chain entities 120 that may be used by server 210, and in particular, by one or more planning engines 212. Data of supply chain data module 220 may be hierarchical objectives specified by, for example, business rules, campaign data, master planning requirements along with scheduling constraints and discrete constraints, such as, for example, sequence dependent setup times, lot-sizing, storage and shelf life constraints.

In one embodiment, server 210 models supply chain campaign planning problems of supply chain network 100. That is, one or more planning engines 212 represents one or more supply chain entities 120 related to supply chain campaign planning problems, in terms of software entities. In addition, or as an alternative, server 210 models the supply chain data of one or more supply chain entities 120, wherein the supply chain data is modeled to represent the flow of items through supply chain network 100. In addition, supply chain network 100, including the supply chain data of one or more supply chain entities 120 is valid for a particular period of interest, i.e., a planning horizon.

Figure 3:
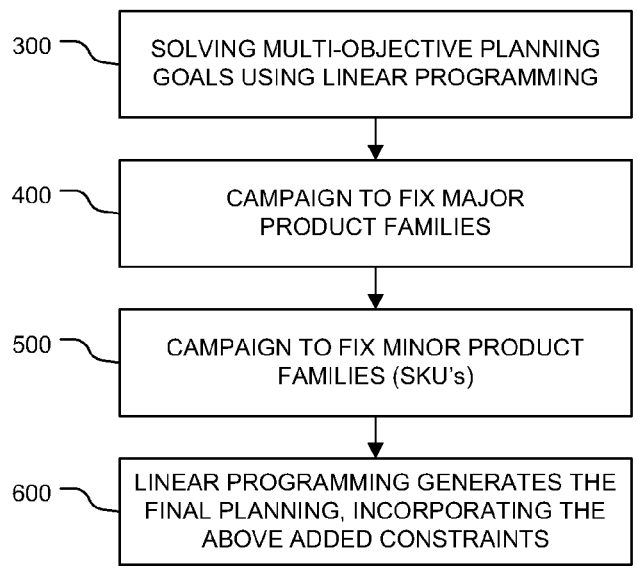
FIG. 3 illustrates an embodiment of the overall workflow of the supply chain planner.

FIG. 3 illustrates an exemplary flowchart of an overall workflow. In one embodiment, supply chain network 100 provides for solving multi-objective planning goals using linear programming (LP) at step 300, campaigning to fix major product families at step 400, campaigning to fix minor product families (for example, SKU's) at step 500, and linear programming (LP) to generate final planning while incorporating the above added constraints at step 600.

At step 300, a supply chain scenario of supply chain network 100 is modeled as a network of nodes and edges. The material storage and/or transition units are modeled as nodes which may be referred to as, for example, buffer nodes, buffers or nodes. Various transportation or manufacturing processes are modeled as edges connecting the nodes. The planning horizon is broken down into elementary time-units, such as, for example, time-buckets, or simply buckets. The edge between two buffer nodes denote processing of material and the edge between different buckets for the same buffer indicates inventory carried forward. Flow-balance constraints for most, if not every buffer in every bucket, model the material movement in the entire supply chain network 100.

Figure 6A:
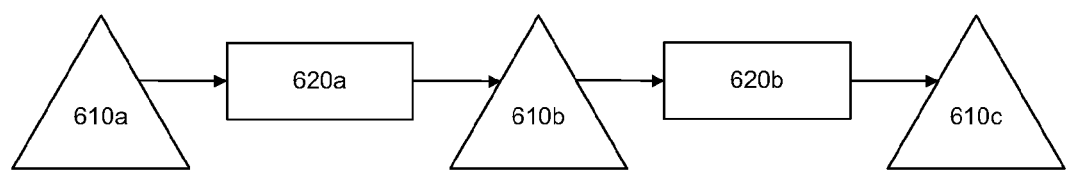
FIG. 6A illustrates an embodiment having particular relationships between items and processes.
Figure 6B:
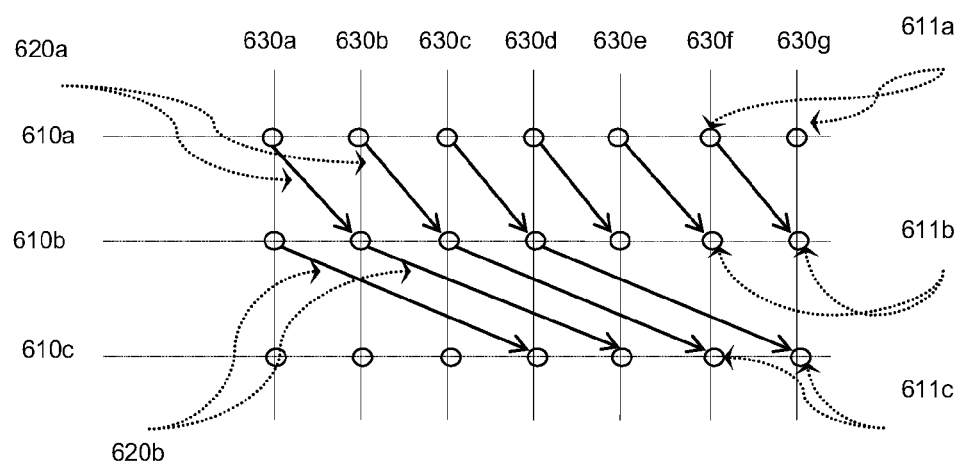
FIG. 6B illustrates a supply chain as a network consisting of nodes and edges.

As an example only and not by way of limitation, FIGS. 6A and 6B illustrates an exemplary supply chain network 100 including three items 610a, 610b, and 610c and two intermediate processes 620a and 620b. Although, an exemplary supply chain network 100 is shown and described as including a particular number of items and process, embodiments contemplate any number of items or processes associated with supply chain network 100. In addition, as discussed above, a planning horizon may be broken down into any number of time-units, in this example, the planning time-line is broken down into a number of discrete time-buckets 630a, 630b . . . 630g (corresponding to seven sequential time buckets) and the storage at the start of these buckets is represented by nodes 611a, 611b, and 611b, which correspond to material storage and/or transition units of items 610a, 610b, and 610c, respectively. The transformation of item 610a to item 610b and item 610b to item 610c is represented by a set of edges connecting these nodes. In one embodiment, these edges are characterized as processes 620a (between nodes 611a and 611b) and 620b (between nodes 611b and 611c). The lead times of the transformation processes are represented by the differences between the start-bucket and end-bucket of the edges. Thus, if each time-bucket 630a, 630b . . . 630g represents one day, then it can be seen that process 620a takes one day, while process 620b takes three days. It should be noted that the item and process described herein is a simplified description for the purpose of illustration. For example, the items may be different sizes, styles, states of same or different physical material typically used in supply chain network 100. Similarly, a process may be any manufacturing, distribution, transportation or any other operation typically used in supply chain network 100. In one embodiment, additional constraints may be added to facilitate other planning rules. The business objectives are prioritized and modeled as hierarchy of objective functions. This model is a linear programming (LP) problem which does not consider discrete variables or constraints. For the sake of simplicity, and without loss of generality, all the objective functions are assumed to be minimized. If any objective function is to be maximized, the objective is negated and minimized for same effect.

In an embodiment, the resources which account for significant changeover times are referred to as campaignable resources. In one embodiment, campaignable resources include resources such as particular manufacturing, distribution, or transportation equipment and facilities, and other such resources utilized in the supply chain. Campaignable resources are obtained as an input from supply chain planner 110. A major family is a group of operations loading this resource and is obtained from the database 220. In another embodiment, the actual operations within each major family are classified as a minor family.

As discussed above, supply chain network 100 provides for campaigning to fix major product families. As discussed above, the packsize (e.g., 4-pack, 6-pack, 12-pack, etc.) and packtype (e.g. bottles, cans, particular packaging options, etc.) combination of, for example, bottle manufacturing requires significant setup time and hence is classified in this example, as a major family. At step 400, supply chain planner 110 runs the linear programming (LP) program to obtain the loading of the campaignable resource for each of the operations, a value hereinafter referenced as the as f_sum.

In embodiments, f_sum refers to line capacities that are maintained and updated in the planning system before every run, taking into account any planned shutdowns or maintenance. In embodiments, the f_sum is characterized as a productivity fraction. However, it will be understood that, in embodiments, the f_sum is not limited to values between 0 and 1. The following non-limiting example is provided for illustrative purposes:

A beverage production facility fills 500 ml and 1000 ml bottles. Both of these processes utilize the same storage tank, but the dispensing time differs for each process. Therefore, in one illustrative example, the throughput on this resource is 60 crates per hour of 500 ml bottles and 40 crates per hour of 1000 ml bottles. The resource divided into, for example, 8-hour increments. The linear programming (LP) plans 180 crates of 500 ml bottles and 200 crates of 1000 ml bottles. In this case, the 500 ml bottles require 3 hours of time on the resource (180 crates/60 crates per hour), and the 1000 ml bottles require 5 hours of time on the resource (200 crates/40 crates per hour). The f_sum for the 500 ml bottles on this 8-hour timeframe, in this example, is 3/8 or 0.375 (3 hours/8 hours), and the f_sum for the 1000 ml bottles is 5/8 or 0.625 (5 hours/8 hours).

In embodiments, the production rate (e.g. 40 crates per hour for 1000 ml bottles) depends on a sequence-dependent setup time. For example, in some embodiments there is a setup time of 4 hours when there is a changeover from 500 ml bottles to 1000 ml bottles. When campaigning to fix the 1000 ml bottle production after the 500 ml bottle production, this changeover time is considered. For example, such a situation, where 160 crates of 1000 ml bottles are needed (which would normally take 4 hours, i.e. 160/4), the production rate will actually be 20 crates per hour, i.e. 160/(4+4), because 4 additional hours are needed for the changeover time, i.e. 160/(4+ 4).

The summation of f_sum over all the operations belonging to a particular family is referred to as f_sum_total for that family. The f_sum_total may then be calculated over a time interval specified by supply chain planner 110, resulting in, for example, a campaign_window. The second moment of each of these families is calculated and referred to as, for example, a centroid. In some implementations, the centroid is related to a weighted deviation, a deviation from an expected value, a deviation from zero, an absolute deviation, a squared deviation, and/or any other statistical calculation that provides a measurement of skewness or asymmetric distribution. The following simplistic example is provided for illustration.

In this illustrative case, for simplicity, major family A only comprises product A and major family B only comprises product B. It is noted that, according to embodiments, at least some major families comprise more than one minor product family. In this simple case, the linear programming (LP) provides a requirement to produce 10, 6, and 2 units of product A (in major family A) during time period 0, 1, and 2, respectively, and a requirement to produce 4, 6, and 10 units of product B (in major family B) during time period 0, 1, and 2, respectively. Thus, the requirement for product A is skewed toward time period 0, while product B is skewed toward time period 2. For example, according to one calculation measuring asymmetric distribution, product A may be calculated as [(10*0+6*1+2*2)/18]=0.555 units away from time period 0, while product B is [4*0+6*1+10*2)/20]=1.3 units away from time period 0.

Summing the requirements, the LP requires 18 units of product A and 20 units of product B for time period 0 to 2. Assuming the production rate of product A equals the production rate of product B, major family B would have a higher f_sum_total than major family A, over time periods 0 to 2. If the major family with the higher f_sum_total is chosen first (examples below provide further examples on how this choice is made), then product B will be chosen for time period 0. However, because the requirement for product B is skewed toward time period 2, it may actually be optimal to choose product A for time period 0. This simplistic example illustrates at least one role of calculating the second moment, or centroid.

In some embodiments, the centroid values and the f_sum_total of all the competing families are determined. In one embodiment, the lowest value of centroid is chosen and another parameter called centroid_closeness_for_res determines the competing f_sums within this range. The family having the largest f_sum_total value in this range is selected. The start and end dates are determined by imposing the f_sum_total over the resource utilization curve, as discussed below in more detail. Once a particular family is fixed, the loading factors are altered such that the next family under consideration accounts for the setup time. Supply chain planner 110 runs the linear programming (LP) program again and the process is repeated until the end of daily buckets. Additional details present in various embodiments of step 400 are depicted in FIG. 4.

Figure 5:
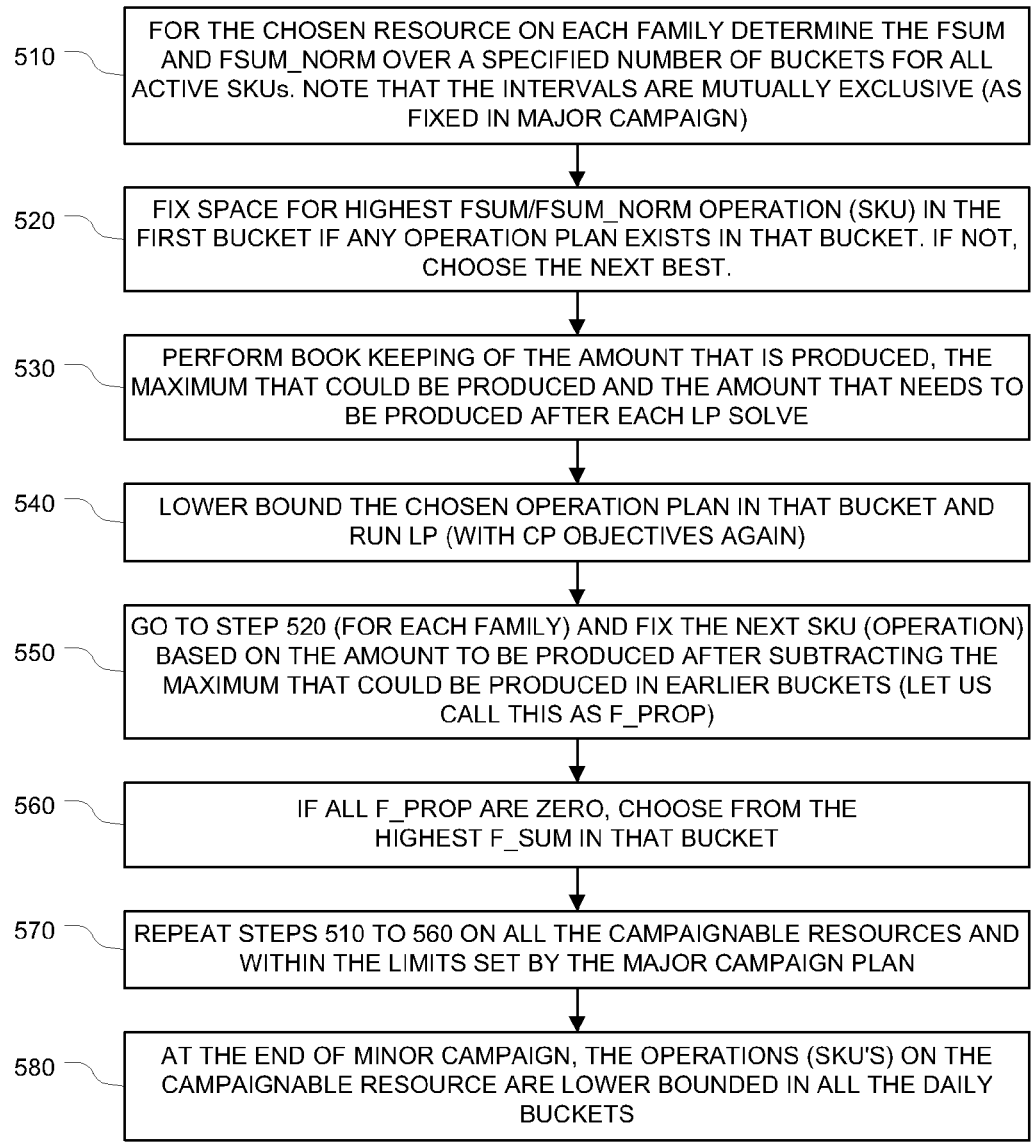
FIG. 5 illustrates an embodiment of a minor campaign planning workflow.

As discussed above, step 400 determines the slots for each major family on each of the campaignable resources. At step 500, supply chain network 100 provides for campaigning to fix minor product families (SKU's). In one embodiment, a minor family refers to any decision subsequent to the major family, such as for example, the flavors of soda that need to be selected within the major family. Supply chain planner 110 runs the linear programming (LP) program and the heuristics obtains the summation of the minor family over the campaign_window. The family with the largest value of f_sum is selected to be produced in first time bucket. All other families now cannot be planned in that bucket. Supply chain planner 110 again runs the linear programming (LP) program, by accounting for the setup time by altering the loading factor in order to account for the loss of capacity on account of setups. Supply chain planner 110 evaluates the f_sums of all minor families. In addition, Supply chain planner 110 initiates a book keeping method that ensures that the free capacity in the first bucket is accounted for before choosing the largest value which now occupies the second bucket. The process is continued until all the buckets are filled. Additional details present in various embodiments of step 500 are depicted in FIG. 5.

As discussed above, supply chain network 100 provides for linear programming to generate final planning while incorporating the above added constraints. At step 600, heuristics determine what should not be done in each of the buckets for each of the campaignable resources. Supply chain planner 110 runs a final run of the linear programming (LP) program to determine the actual amount that needs to be produced in each of the buckets. This final run also maintains the upstream and downstream equilibrium and also plans in buckets, which have length larger than daily buckets. In one embodiment, the final plan is ready at this stage. Additional details present in various embodiments of step 600 are depicted in FIG. 6.

Figure 4:
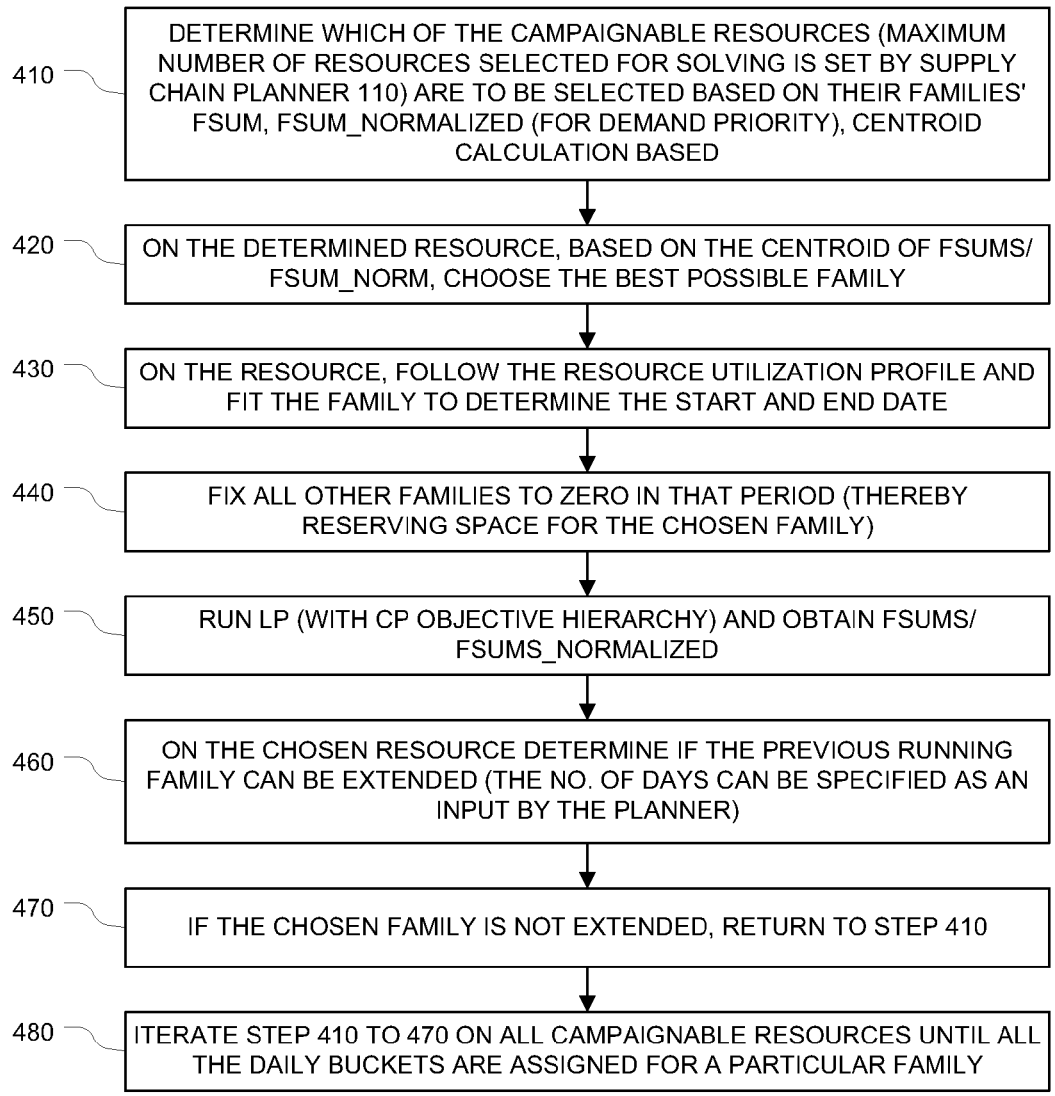
FIG. 4 illustrates an embodiment of a major campaign planning workflow.

FIG. 4 illustrates a flowchart of major campaign planning. At step 410, supply chain planner 110 determines which of the campaignable resources (maximum number of resources selected for solving is set by supply chain planner 110) are to be selected based on their families' f_sum, f_sum_normalized (for demand priority), and/or centroid calculation based. In one embodiment, all of the campaignable resources are identified by supply chain planner 110, and the lowest centroid value for a major family on each of the resources is identified. A shortlist of families which includes the family with the lowest centroid value and all the families within a neighborhood (a tolerance defined as centroid_closeness_for_res) of the lowest centroid family is created. The family with the largest f_sum value among the shortlisted families is selected as the best family for the campaignable resource. The number of resources that can be selected is specified by supply chain planner 110 using a parameter called campaign_fix_per_iteration. In one embodiment, campaign_fix_per_iteration is set to one, meaning only one resource is chosen across all the campaignable resources on which supply chain planner 110 intends to fix the campaigns. The centroid values of the best families of the resources are compared and the resource which has the least centroid value is chosen. If this parameter is more than one, then they are selected in order of their increasing centroid values.

By way of example, and not by way of limitation, if there are 3 campaignable resources, such as, for example, Resource_1, Resource_2, Resource_3 with best family's centroid value of 4.5, 1.9, and 2.1 respectively and the campaign_fix_per_iteration value is 2, then resources Resource_2 and Resource_3 would be selected.

At step 420, supply chain planner 110 chooses the best possible family based on the centroid of f_sums/f_sum_norm for the determined resource of step 410. In one embodiment, if demand priorities are specified, supply chain planner 110 breaks out the operation plans based on the priorities. Supply chain planner 110 utilizes the f_sum_norm, which is a normalized value of the f_sum after accounting for the priority of the demand that gets planned on the campaignable resource. For campaignable resources, the best family is the family which has a higher f_sum (f_sum_norm when there are demand priorities) between the lowest centroid value and the centroid_closeness_for_res range.

As an example only and not by way of limitation, consider a resource namely Resource_1 for 3 families:
Resource_1_FAMILY_1 has f_sum=2.4, centroid=4.5, f_sum_norm=0.3.
Resource_1_FAMILY_2 has f_sum=0.8, centroid=3.5, f_sum_norm=0.1.
Resource_1_FAMILY_3 has f_sum=0.8, centroid=3.5, f_sum_norm=0.1.

If the value of option centroid_closeness_for_res is 2 then family Resource_1_FAMILY_1 would be the best family since Resource_1_FAMILY_1 has a higher f_sum/f_sum_norm value, even though its centroid value is not the lowest value. In this example, Resource_1_FAMILY_1's centroid value is 4.5 and is within 2 units of the lowest value.

In an embodiment, the centroid of a family is a summation of the product of the operation plan value and its loading bucket index divided by the summation of the operation plan value. The summation is over all the operation plans of the family in the campaign_window interval, wherein the campaign_window is a parameter specified by supply chain planner 110 e.g., 8 buckets.

At step 430, supply chain planner 110 determines the start and end date by following the resource utilization profile on the resource and fits the family. In one embodiment, on each of the campaignable resources, supply chain planner 110 runs the linear programming (LP) program to plan all the operations (major and minor) and hence the total load in each bucket gives the bucket's utilization. The resource utilization profile is thus the linear programming (LP) load over the time interval. For the chosen family, the f_sum value over the campaign_window is determined, which is superimposed on the resource utilization curve to determine the length of the campaign. In addition, supply chain planner 110 may specify the minimum and maximum campaign lengths for the major family. Based on the lower of these two values, supply chain planner 110 determines the ending date of the major family.

As an example only and not by way of limitation, for Resource_1, best family is Resource_1_FAMILY_1. Resource_1_FAMILY_1 has two minor families SKU_1 and SKU_2 which have the following f_sum across campaign_window, shown in Table 1:

TABLE 1

| Bucket Index | 1 | 2 | 3 | 4 | 5 | 6 | 7 | 8 |
|---|---|---|---|---|---|---|---|---|
| SKU_1 | 0.1 | 0.1 | 0.1 | 0.1 | 0.4 | 0.4 | 0.4 | 0.4 |
| SKU_2 | 0.05 | 0.05 | 0.05 | 0.05 | 0.05 | 0.05 | 0.05 | 0.05 |

Thus, in this example, Resource_1_FAMILY_1 has f_sum_total=2.4

The utilization profile of the resource, in this example, is shown in Table 2:

TABLE 2

| Bucket Index | 1 | 2 | 3 | 4 | 5 | 6 | 7 | 8 |
|---|---|---|---|---|---|---|---|---|
| Resource Usage | 0.35 | 0.35 | 0.35 | 0.35 | 0.65 | 0.65 | 0.65 | 0.65 |

Starting from the first bucket, supply chain planner 110 superimposes the chosen family usage over the total resource usage till it exceeds f_sum_total. Thus, in this example, f_sum_total of 2.4 may then be fitted in the first 6 buckets, if the resource utilization profile is followed. In this example, 6 buckets is the campaign length for which the first campaign of family Resource_1_FAMILY_1 on resource Resource_1 will run. If the maximum campaign length is specified to be, for example, 5 days by supply chain planner 110, then the campaign length would be trimmed from 6 days to 5 days.

At step 440, supply chain planner 110 fixes all other families to zero in that period, thereby reserving space for the chosen family. In one embodiment, after supply chain planner 110 selects a major family and the campaign start and end dates on the campaignable resource, supply chain planner 110 fixes the other families (operations, and hence SKU's to be specific) to zero. Fixing the other families to zero ensures that during the next linear programming (LP) iteration, rebalancing occurs and no other family is planned in the reserved space.

Referring to the previous example, in the first 6 buckets or, as discussed above, 5 buckets if the maximum campaign length is specified as 5 buckets, all the operation plans of Resource_1_FAMILY_2 and Resource_1_FAMILY_3 would be fixed to 0.

At step 450, supply chain planner 110 runs the linear programming (LP) problem (with CP objective hierarchy) and obtains f_sums/f_sums_normalized. In one embodiment, after fixing the other families, supply chain planner 110 runs the linear programming (LP) problem again based on the hierarchical approach. The linear programming (LP) plan itself rebalances operations to maximize the demand satisfaction. Supply chain planner 110 recalculates the f_sums and f_sums_normalized for the subsequent campaign_window duration based on the linear programming (LP) output.

At step 460, supply chain planner 110 determines if the previous running family can be extended for the determined resource of step 410. In addition, the extension may be an extension of the number of days and may be specified as input by supply chain planner 110. In one embodiment, supply chain planner 110 evaluates the prudence of extending the current family by examining the f_sum_total values in the next campaign_extend_window duration and comparing the f_sum_total values in the next campaign_extend_window duration with campaign_extend_fraction, prior to making a decision to select the next family.

By way of example only and not by way of limitation, if the campaign_extend_window is 3 and campaign_extend_fraction is 0.95, then the linear programming (LP) problem output for the last running family Resource_1_FAMILY_1 on resource Resource_1 is shown in Table 3:

TABLE 3

| Bucket Index | 6 | 7 | 8 |
|---|---|---|---|
| SKU_1 | 0 | 0.4 | 0.4 |
| SKU_2 | 0 | 0.05 | 0.05 |

Then, f_sum_total for the family Resource_1_FAMILY_1 is 0.9, which is less than the campaign_extend_fraction. Therefore, the selected family will not be extended. Otherwise this f_sum_total would be fitted based on the resource utilization profile.

At step 470, if the chosen family is not extended, then the process returns to step 410. In one embodiment, if a new family is selected the process repeats again starting from the linear programming (LP) problem run, that is, the evaluation of f_sum and fixing it using the heuristic procedures.

At step 480, supply chain planner 110 iterates steps 410 through 470 on all campaignable resources until all the daily buckets are assigned for a particular family. In one embodiment, the process as discussed above, in steps 410 through 470 are iterated on all campaignable resources. The fixing is continued until all the campaignable resources have a major family assigned in each of the daily buckets. If there are no f_sums, then the last family is extended until the end of the campaign horizon. In addition, although, FIG. 4 illustrates one embodiment of a method of major campaign planning, various changes may be made to method 400 without departing from the scope of embodiments of the present invention.

FIG. 5 illustrates a flow chart of minor campaign planning. At step 510, supply chain planner 110 determines the f_sum and f_sum_norm for the chosen resource over a specified number of buckets for all active SKUs. In addition, the intervals are mutually exclusive (as fixed in the major campaign). In one embodiment, supply chain planner 110 runs the linear programming (LP) problem using the hierarchical objectives specified along with additional constraints generated during the major campaign from step 400.

During step 510, on each campaignable resource, supply chain planner 110 computes the f_sum of each minor family. Since the major campaigns are mutually exclusive, supply chain planner 110 determines which minor family needs to be fixed in the chosen bucket for each major family. In addition, supply chain planner 110 obtains the f_sum and f_sum_norm values based on the linear programming (LP) problem run, over the campaign_window.

At step 520, supply chain planner 110 provides for fixing space for the operation (SKU) with the highest f_sum and f_sum_norm in the first bucket, if any operation plan exists in that bucket. If no operation plan exists in that bucket, then supply chain planner 110 selects the next best operation (SKU). In one embodiment, supply chain planner 110 provides the f_sum, or f_sum_norm when there is demand priority and when a breakout needs to be done to obtain a normalized value. In the bucket which needs to be fixed, supply chain planner 110 first determines if any operation plan is present. For all such present plans, supply chain planner 110 chooses the highest value of f_sum and then lower bounds it in that bucket. In the same bucket, the operation plans for all other minor families are fixed to zero, meaning that the operation can only increase the production of this operation (SKU) in that bucket.

By way of example only and not by way of limitation, let the linear programming (LP) plan for the family Resource_1_FAMILY_1 on resource resource_1 be as given in table 4 below. Note that buckets 6 and 7 were reserved for a different family during the major campaign, and hence there are no operation plans for the SKU's of FAMILY_1 in those buckets.

TABLE 4

| Bucket Index | 1 | 2 | 3 | 4 | 5 | 6 | 7 | 8 |
|---|---|---|---|---|---|---|---|---|
| SKU_1 | 0.1 | 0.1 | 0.1 | 0.3 | 1.0 | — | — | 0.4 |
| SKU_2 | 0.05 | 0.05 | 0.05 | 0.2 | 0 | — | — | 0.05 |

In this example, for SKU_1 the summation of f_sum over the campaign_window is 2 and for SKU_2 it is 0.4. The operation plan belonging to SKU_1 would then be lower bounded to 0.1 in bucket 1 and operation plan of SKU_2 would then be fixed to 0. This means that in the final result, the operation plan for SKU_1 in bucket 1 would be equal to or more than 0.1 and the operation plans for the remaining SKUs (belonging to the same minor family, as well as other major families) would be non-existent in bucket 1.

At step 530, provides for book keeping (an "accounting" of) the amount that is produced, the maximum that could be produced, and the amount that needs to be produced after each variable fixing. In one embodiment, supply chain planner 110 runs the linear programming (LP) problem again. However, this time a book keeping (accounting) exercise is used to see what is planned in the previous buckets and what additional may be planned. The f_sums obtained are reduced by the leftover amount in book keeping. This ensures that the earlier buckets are fully utilized by that minor family. The computed value of f_sum is compared with other f_sums, to determine the next minor family that would be selected in the chosen bucket.

By way of example only and not by way of limitation, a snapshot provided by linear programming (LP) plan at this point is given in Table 5 below and supply chain planner 110 needs to determine the SKU that will be planned in bucket 2.

TABLE 5

| Bucket Index | 1 | 2 | 3 | 4 | 5 | 6 | 7 | 8 | 9 |
|---|---|---|---|---|---|---|---|---|---|
| SKU_1 | 0.1 | 0.1 | 0.1 | 0.3 | 1.0 | — | — | 0.4 | 0 |
| SKU_2 | — | 0.1 | 0.05 | 0.2 | 0 | — | — | 0.5 | 0 |

In this example, f_sum for SKU_1 is 1.9 (f_sum over next 8 buckets starting from bucket 2) and 0.4 for SKU_2. Supply chain planner 110 calculates, in this example, f_sum_prop for SKU_1 to be 1.9-{1-0.1}=1, meaning 0.9 of SKU_1 may still be made in bucket 1. However, 1 unit would still be remaining for SKU_1 and 0.4 units for SKU_2. Therefore, SKU_1 would be chosen to run in bucket 2.

By way of example only and not by way of limitation, a snapshot after the subsequent linear programming (LP) iteration is given in Table 6 below and supply chain planner 110 needs to determine the SKU that will occupy bucket 3.

TABLE 6

| Bucket Index | 1 | 2 | 3 | 4 | 5 | 6 | 7 | 8 | 9 | 10 |
|---|---|---|---|---|---|---|---|---|---|---|
| SKU_1 | 0.1 | 0.1 | 0.1 | 0.3 | 1.0 | — | — | 0.4 | 0 | 0 |
| SKU_2 | — | — | 0.15 | 0.2 | 0 | — | — | 0.5 | 0 | 0 |

In this example, f_sum for SKU_1 is 1.8 (f_sum over next 8 buckets starting from bucket 3) and for SKU_2 is 0.4. Supply chain planner 110 calculates, in this example, sum_prop for SKU_1 to be 1.8-{2-0.2}=0 (2-0.2)=1.8 of SKU_1 can still be made in bucket 1 and bucket 2 and for SKU_2 to be 0.4. Now SKU_2 is chosen to occupy bucket 3.

At step 540, supply chain planner 110 lower bounds the chosen operation plan in that bucket and runs the linear programming (LP) problem (with CP objectives again). In one embodiment, during each linear programming (LP) problem run, once the minor family is selected for a particular bucket, the minor family is lower bounded to the value of f_sum. All other operations (minor families) are fixed to zero. Supply chain planner 110 runs the linear programming (LP) problem again in the hierarchical manner based on predetermined business objectives.

At step 550, supply chain planner 110 returns to step 520 (for each family) and fixes the next SKU (operation) based on the amount to be produced after subtracting the maximum that could be produced in earlier buckets (which is referred to as f_prop). In one embodiment, supply chain planner 110 fixes one bucket at a time with the minor family (in a minor campaign), which determines the SKU that is produced on a particular campaignable resource. To improve performance, one bucket for each major family is finalized at this step. This finalizing accounts for what is produced before, such that pre-building may happen and other minor families may be taken up. Supply chain planner 110 then returns to step 520 (for each family) and fixes the next SKU (operation) based on the amount to be produced after subtracting the maximum amount that could be produced in earlier buckets (referred to as f_prop).

At step 560, supply chain planner 110 chooses from the highest f_sum value in that bucket, if all f_prop are zero. In one embodiment, a corner case exists that nothing is loaded in a particular bucket. That is, if all f_prop are zero, then the highest f_sum_total for that minor family over the campaign length is chosen and assigned to that bucket.

At step 570, supply chain planner 110 repeats steps 510 to 560 on all the campaignable resources and within the limits set by the major campaign plan. In one embodiment, steps 510 through 560 may be repeated if all the buckets are assigned a particular minor family that would get planned. Supply chain planner 110 may specify the minimum and maximum minor campaign length.

At step 580, supply chain planner 110 lower bounds the operations (SKU's) on the campaignable resource in all the daily buckets, at the end of the minor campaign. In one embodiment, supply chain planner 110 lower bounds all the buckets across all campaignable resources by the SKU that gets planned. Step 580, completes the campaign, which indicates which is the major family interval and within each such interval, which is the minor family that gets planned. In addition, although, FIG. 5 illustrates one embodiment of a method of minor campaign planning, various changes may be made to method 500 without departing from the scope of embodiments of the present invention.

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments of the present invention have been shown and described, it will be understood that various changes and modifications to the foregoing embodiments may become apparent to those skilled in the art without departing from the spirit and scope of embodiments of the present invention. Accordingly, the invention is not limited to the embodiments disclosed, but is capable of numerous rearrangements, modification and substitutions without departing from the spirit and scope of the present invention.

What is claimed is:

1. A system of solving supply chain campaign planning problems involving major and minor setups, comprising:
   a database that stores data describing a plurality of major product families, data describing a plurality of minor product families, data describing a campaignable resource, and data describing a planning horizon;
   a computer comprising a memory and a processor coupled with the database and configured to:
      execute a major campaign, comprising:
         for two or more of the plurality of major product families:
            obtaining a major productivity fraction of the campaignable resource for an operation associated with a major product family;
            aggregating the major productivity fractions of the campaignable resource for operations associated with the major product family over a time interval that comprises at least a portion of a major time period; and
            calculating a second moment for the major product family over a time interval that comprises at least a portion of the major time period; and
         fixing an optimal major product family of the two or more major product families to the major time period on the planning horizon, in association with the campaignable resource, based at least on the aggregated major productivity fractions and the calculated second moments of a plurality of the two or more major product families; and
      execute a minor campaign, comprising:
         for two or more minor product families associated with the optimal major product family, obtaining a minor productivity fraction of the campaignable resource for a minor product family over at least a portion of the major time period; and
         fixing an optimal minor product family from the two or more minor product families to a minor time period based at least on the minor productivity fraction.

2. The system of claim 1, wherein executing a minor campaign further comprises, for the two or more minor product families associated with the optimal major product family:
   determining whether the minor product family is fixed to a previous minor time period; and
   when the minor product family is fixed to a previous minor time period: prior to fixing an optimal minor product family to a minor time period, reducing the minor productivity fraction by an amount substantially equal to a maximum productivity of the minor product family for the previous minor time period.

3. The system of claim 1, wherein the second moment comprises a variance of the productivity fraction of the campaignable resource for at least one operation belonging to the major product family.

4. The system of claim 1, wherein fixing an optimal major product family of the two or more major product families to the major time period on the planning horizon further comprises:
   selecting the optimal major product family from a short-list of major product families comprising a major product family having a lowest calculated second moment and one or more major families having a second moment within a predetermined range of the lowest calculated second moment.

5. The system of claim 1, wherein executing a major campaign further comprises, for the two or more of the plurality of major product families:
   determining a changeover time between the major product family and a prior major or minor product family fixed to a time period immediately prior to the major time period on the planning horizon, in association with the campaignable resource, the changeover time comprising at least one of:
      a sequence-dependent cleanup time; and
      a sequence-dependent setup time; and
   wherein fixing an optimal major product family of the two or more major product families to the major time period on the planning horizon, in association with the campaignable resource is further based at least on the changeover times of the two or more major product families.

6. The system of claim 1, wherein executing a minor campaign further comprises, for the two or more minor product families associated with the major product family:
   determining a changeover time between the minor product family and a prior major or minor product family fixed to a time period immediately prior to the minor time period on the planning horizon, in association with the campaignable resource, the changeover time comprising at least one of:
      a sequence-dependent cleanup time; and
      a sequence-dependent setup time; and
   wherein fixing an optimal minor product family from the two or more minor product families to a minor time period is further based at least on the changeover times of the two or more minor product families.

7. A non-transitory computer-readable media embodied with software that solves supply chain campaign planning problems involving major and minor setups, the software when executed using one or more computers is configured to:
   execute a major campaign, comprising:
      for two or more of the plurality of major product families:
         obtaining a major productivity fraction of the campaignable resource for an operation associated with a major product family;
         aggregating the major productivity fractions of the campaignable resource for operations associated with the major product family over a time interval that comprises at least a portion of a major time period; and
         calculating a second moment for the major product family over a time interval that comprises at least a portion of the major time period; and fixing an optimal major product family of the two or more major product families to the major time period on the planning horizon, in association with the campaignable resource, based at least on the aggregated major productivity fractions and the calculated second moments of a plurality of the two or more major product families; and execute a minor campaign, comprising:
for two or more minor product families associated with the optimal major product family, obtaining a minor productivity fraction of the campaignable resource for a minor product family over at least a portion of the major time period; and
fixing an optimal minor product family from the two or more minor product families to a minor time period based at least on the minor productivity fraction.

8. The non-transitory computer-readable media of claim 7, wherein the software is further configured to execute a minor campaign, for the two or more minor product families associated with the optimal major product family, by:
determining whether the minor product family is fixed to a previous minor time period; and
when the minor product family is fixed to a previous minor time period: prior to fixing an optimal minor product family to a minor time period, reducing the minor productivity fraction by an amount substantially equal to a maximum productivity of the minor product family for the previous minor time period.

9. The non-transitory computer-readable media of claim 7, wherein the second moment comprises a variance of the productivity fraction of the campaignable resource for at least one operation belonging to the major product family.

10. The non-transitory computer-readable media of claim 7, wherein fixing an optimal major product family of the two or more major product families to the major time period on the planning horizon further comprises:
selecting the optimal major product family from a short-list of major product families comprising a major product family having a lowest calculated second moment and one or more major families having a second moment within a predetermined range of the lowest calculated second moment.

11. The non-transitory computer-readable media of claim 7, wherein the software is further configured to execute a major campaign, for the two or more of the plurality of major product families, by:
determining a changeover time between the major product family and a prior major or minor product family fixed to a time period immediately prior to the major time period on the planning horizon, in association with the campaignable resource, the changeover time comprising at least one of:
a sequence-dependent cleanup time; and
a sequence-dependent setup time; and
wherein fixing an optimal major product family of the two or more major product families to the major time period on the planning horizon, in association with the campaignable resource is further based at least on the changeover times of the two or more major product families.

12. The non-transitory computer-readable media of claim 7, wherein the software is further configured to execute a minor campaign, for the two or more minor product families associated with the major product family, by:
determining a changeover time between the minor product family and a prior major or minor product family fixed to a time period immediately prior to the minor time period on the planning horizon, in association with the campaignable resource, the changeover time comprising at least one of:
a sequence-dependent cleanup time; and
a sequence-dependent setup time; and
wherein fixing an optimal minor product family from the two or more minor product families to a minor time period is further based at least on the changeover times of the two or more minor product families.

13. A method of solving supply chain campaign planning problems involving major and minor setups, the method comprising:
executing, by a computer, a major campaign, comprising:
for two or more of the plurality of major product families:
obtaining, by the computer, a major productivity fraction of the campaignable resource for an operation associated with a major product family;
aggregating, by the computer, the major productivity fractions of the campaignable resource for operations associated with the major product family over a time interval that comprises at least a portion of a major time period; and
calculating, by the computer, a second moment for the major product family over a time interval that comprises at least a portion of the major time period; and
fixing, by the computer, an optimal major product family of the two or more major product families to the major time period on the planning horizon, in association with the campaignable resource, based at least on the aggregated major productivity fractions and the calculated second moments of a plurality of the two or more major product families; and
executing, by the computer, a minor campaign, comprising:
for two or more minor product families associated with the optimal major product family, obtaining, by the computer, a minor productivity fraction of the campaignable resource for a minor product family over at least a portion of the major time period; and
fixing, by the computer, an optimal minor product family from the two or more minor product families to a minor time period based at least on the minor productivity fraction.

14. The method of claim 13, wherein executing a minor campaign further comprises, for the two or more minor product families associated with the optimal major product family:
determining, by the computer, whether the minor product family is fixed to a previous minor time period; and
when the minor product family is fixed to a previous minor time period: prior to fixing an optimal minor product family to a minor time period, reducing, by the computer, the minor productivity fraction by an amount substantially equal to a maximum productivity of the minor product family for the previous minor time period.

15. The method of claim 13, wherein the second moment comprises a variance of the productivity fraction of the campaignable resource for at least one operation belonging to the major product family.

16. The method of claim 13, wherein fixing an optimal major product family of the two or more major product families to the major time period on the planning horizon further comprises:
selecting, by the computer, the optimal major product family from a short-list of major product families comprising a major product family having a lowest calculated second moment and one or more major families having a second moment within a predetermined range of the lowest calculated second moment.

17. The method of claim 13, wherein executing a major campaign further comprises, for the two or more of the plurality of major product families:

determining, by the computer, a changeover time between the major product family and a prior major or minor product family fixed to a time period immediately prior to the major time period on the planning horizon, in association with the campaignable resource, the changeover time comprising at least one of:
 a sequence-dependent cleanup time; and
 a sequence-dependent setup time; and wherein fixing an optimal major product family of the two or more major product families to the major time period on the planning horizon, in association with the campaignable resource is further based at least on the changeover times of the two or more major product families.

18. The method of claim 13, wherein executing a minor campaign further comprises, for the two or more minor product families associated with the major product family:

determining, by the computer, a changeover time between the minor product family and a prior major or minor product family fixed to a time period immediately prior to the minor time period on the planning horizon, in association with the campaignable resource, the changeover time comprising at least one of:
 a sequence-dependent cleanup time; and
 a sequence-dependent setup time; and wherein fixing an optimal minor product family from the two or more minor product families to a minor time period is further based at least on the changeover times of the two or more minor product families.

* * * * *